United States Patent [19]

Stark

[11] 4,187,398

[45] Feb. 5, 1980

[54] TELEPHONE AND DATA NETWORK FOR MOBILE SUBSCRIBERS

[75] Inventor: Anselm Stark, Munich, Fed. Rep. of Germany

[73] Assignee: Siemens Aktiengesellschaft, Berlin & Munich, Fed. Rep. of Germany

[21] Appl. No.: 879,212

[22] Filed: Feb. 21, 1978

[30] Foreign Application Priority Data

Mar. 7, 1977 [DE] Fed. Rep. of Germany ....... 2709855

[51] Int. Cl.² ............................................. H04Q 7/00
[52] U.S. Cl. ................................. 179/2 EB; 325/55
[58] Field of Search ............ 179/2 EB, 2 EC; 325/55

[56] References Cited

U.S. PATENT DOCUMENTS 3,898,390  8/1975  Wells et al. ...................... 179/2 EB

FOREIGN PATENT DOCUMENTS 2040028  2/1972  Fed. Rep. of Germany ........ 179/2 EB Primary Examiner—Bernard Konick
Assistant Examiner—Joseph A. Popek
Attorney, Agent, or Firm—Hill, Van Santen, Steadman, Chiara & Simpson

[57] ABSTRACT

A telephone and data network for mobile subscribers comprises radio concentrators locally distributed in the overall area of a radio network which can communicate via radio with the mobile subscribers and comprises radio exchange offices associated with one or more concentrators connected to the public telephone system and, if applicable, for the purpose of data transmission between mobile subscribers and subscribers to the public data network to the teleprinter and data network. The call number of each mobile subscriber and the area code corresponding to his location in any particular case with respect to the associated radio exchange and-/or the associated radio concentrator, are retrievably stored in a local memory associated with the corresponding local area and one global memory is associated, in each case, with a plurality of the local memories, to which global memory the data concerning the prevailing location of all mobile subscribers of the large area from the individual local memories, are transmitted and are retrievably stored. A central computer controls the exchange of the data relating to the subscribers' location between the local memories and the global memories.

5 Claims, 4 Drawing Figures

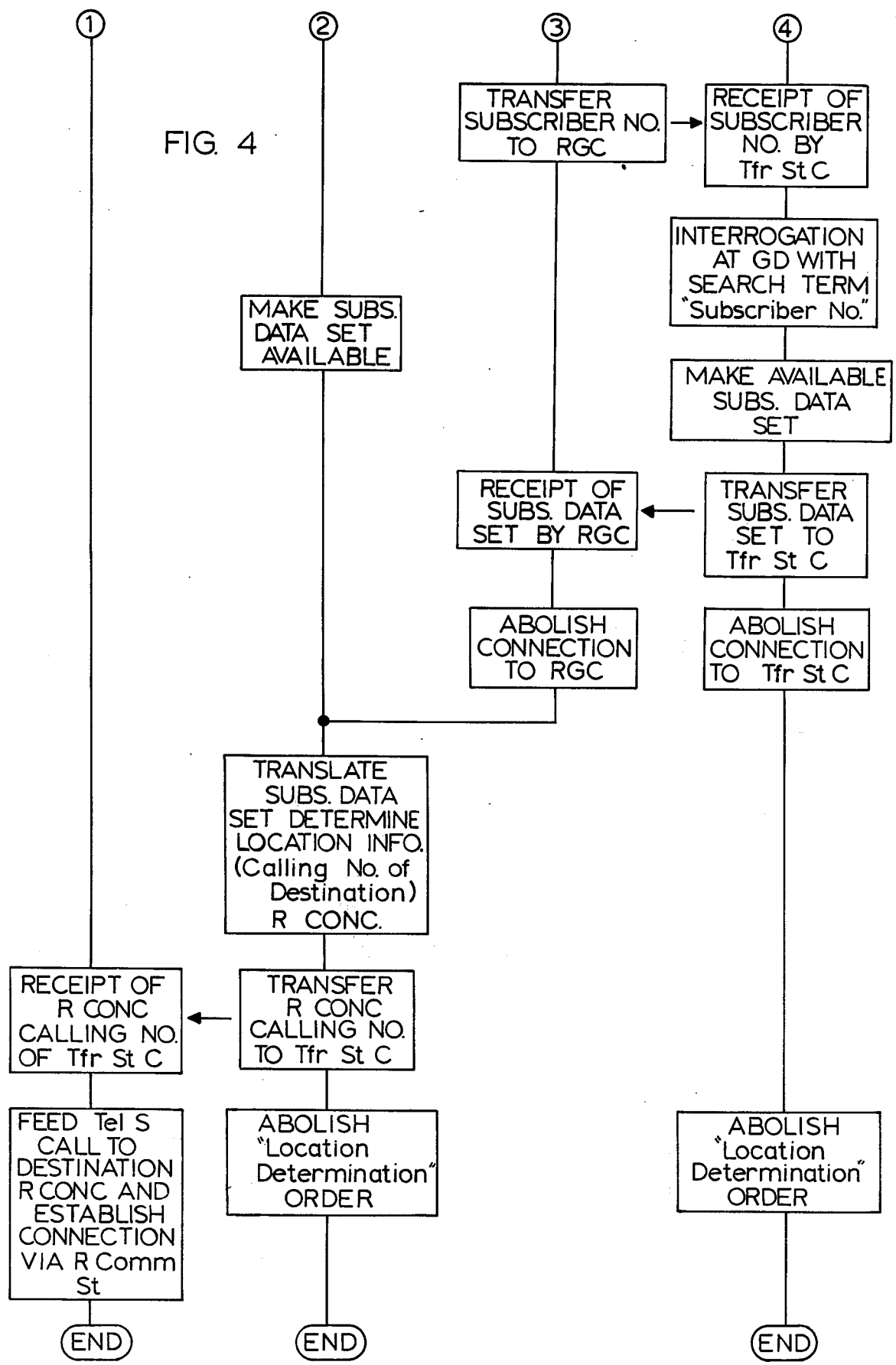

TELEPHONE AND DATA NETWORK FOR MOBILE SUBSCRIBERS

BACKGROUND OF THE INVENTION

1. Field of the Invention

The present invention relates to a telephone and data network for mobile subscribers comprising radio concentrators locally distributed in the overall area of a radio network, which can communicate by way of a radio with the mobile subscribers and comprising radio exchange offices associated with one or more concentrators connected to the public telephone system and, where applicable, for the purpose of data transmission, between mobile subscribers and subscribers to the public data network, to the teleprinter and data network.

2. Description of the Prior Art

If in a network for mobile subscribers a stationary or mobile subscriber dials a mobile subscriber's station, care must be taken that the call will reach the dialed mobile subscriber's station even if it is located in the area of a radio exchange office other than its home radio exchange office. It is known, for example from the German published application No. 2,040,028, to assign the call numbers of all mobile subscriber stations along with the area code of that temporary exchange office in whose area the mobile subscriber happens to be to one central telephone or call number memory which can be interrogated indirectly from each telephone exchange. If, in fact, a call is received at a temporary exchange office which is directed to a mobile subscriber, a connection is established automatically to the central call number memory and the latter is interrogated as to whether the number called is stored there. If the number is so stored, the area code stored for the number called is transmitted back to the interrogating temporary exchange and the latter establishes a connection. One disadvantage of this known prior method is the fact that all incoming calls directed to a mobile subscriber must be transmitted to the central call number memory. If this call number memory fails due to some defect, a connection to a mobile subscriber is no longer possible. Moreover, it is complicated, even in case of a connection within the area of the same radio exchange office to first inquire of the call number memory.

SUMMARY OF THE INVENTION

The object of the present invention is to provide a telephone and data network for mobile subscribers where the establishment of a connection with a mobile subscriber, who happens to be located at an arbitrary location within the large area of a radio network, is possible in a simple and safe manner which is of low susceptibility to trouble.

The present invention attains this objective in a telephone and data network of the type generally set forth above in that the call number of each mobile subscriber and the area code corresponding to his location in any particular case of the associated radio exchange and/or the associated radio concentrator are stored for calling in a memory associated with the corresponding place of travel and one global memory is associated in each case with a plurality of local memories, to which global memory the data are transmitted about the prevailing location of all mobile subscribers of the large area from the individual local memories in which they are stored for calling.

In the event that the calling and the called subscriber are in the same area, the information concerning location of a called mobile subscriber can be accomplished by the local memory, and if this is not the case, by inquiring of the associated local memory. This requires as few data transmissions as possible and, in establishing a connection, the subscribers have only short waiting times.

The reports concerning the locations must be distributed by the processing offices to the information offices. An exchange of data between the global memories and the local memories is required. Preferably, a central computer is provided to control this exchange of data.

Global and local computers which form, with the central computer, a hierarchical computer system, preferably are assigned to the global memories and the local memories for the processing of the location data in the global and local memories and for answering interrogations concerning location. The local computers, preferably, are associated with the radio concentrators, while the global computers are associated with the radio exchange offices.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. 3 and 4 are flow charts to aid in understanding the invention.

DESCRIPTION OF THE PREFERRED EMBODIMENT

In a mobile radio network, connections shall be automatically established between mobile radio subscribers and between wire subscribers and mobile radio subscribers. Within the overall area in which the mobile radio communication system is to be established, locally distributed radio concentrators are provided. When radio exchange office is respectively associated with about seven radio concentrators which can communicate with the telephone system via transfer points.

Figure 1:
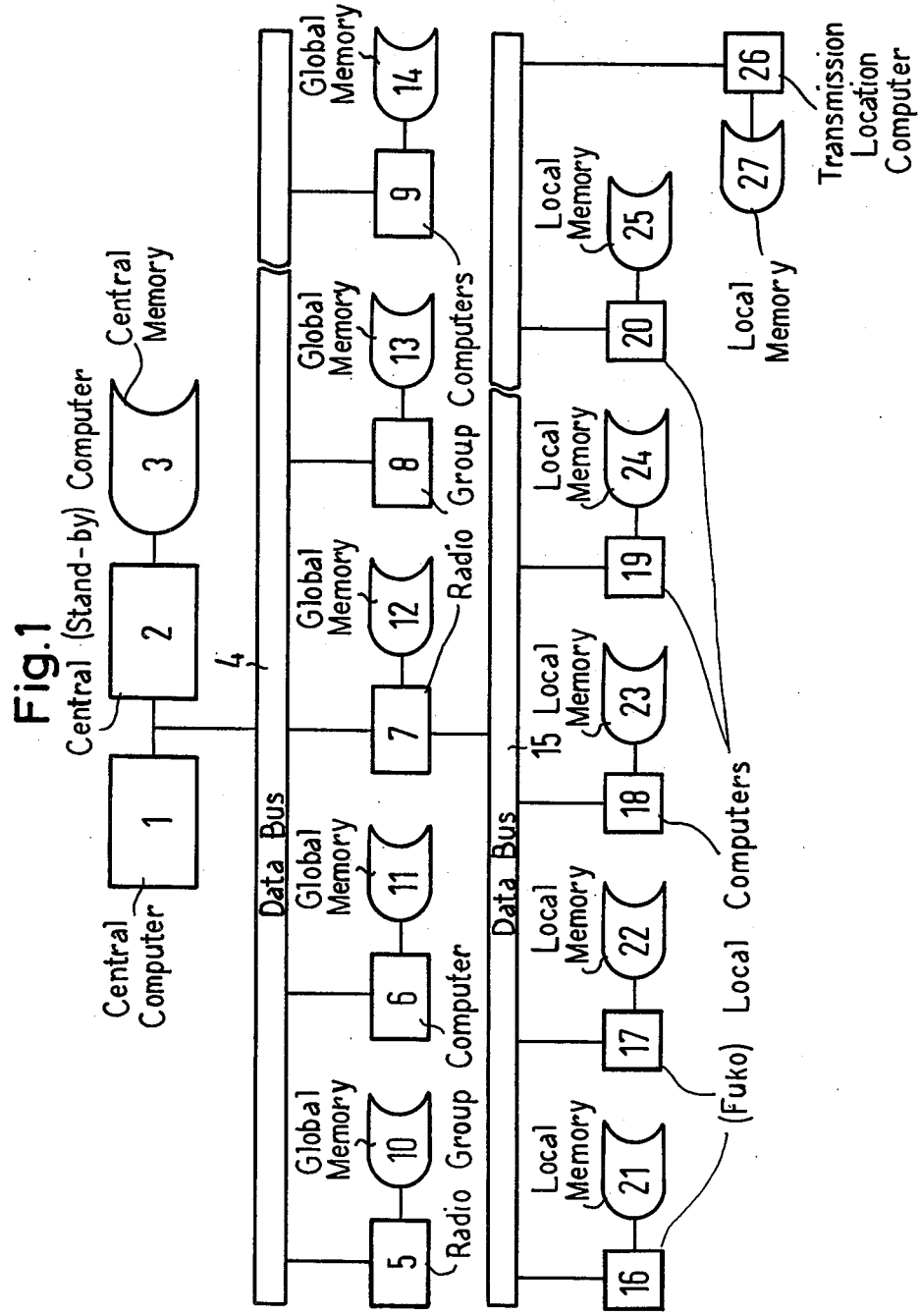
FIG. 1 is a schematic illustration of a hierarchical structure of local and global memories with associated computers.

In establishing a connection to a mobile subscriber, the subscriber's location must be known to the exchange facility. This requires interrogating a system which is able to furnish information concerning the momentary location of the called mobile subscriber. For this purpose, the system illustrated in FIG. 1 is provided in which the system comprises local and global memories and computers associated therewith. The system comprises, in the lowermost level, operational computers associated with the radio concentrators, these computers being hereinafter designated as Fuko computers 16, 17, 18, 19 and 20. The Fuko computers consist, for example, of one or more microprocessors, for example of the type Intel 8080, manufactured by the Intel Company. The Fuko computers are connected to local memories which here perform the function of data banks 21, 22, 23, 24 and 25 and may comprise semiconductor memories or magnetic A.S. 8.2.78 disk memories.

The task of the local memories 21-25 is to store the data of location of all active mobile subscribers who accidentally happen to be within a local area approximately in the size of the radio communication range. Thereby, the active subscribers are monitored in the area of the associated radio concentrator by the radio concentrator, while the remaining data concerning location are furnished by the superposed radio group computers 5, 6, 7, 8 and 9.

Search inquiries for establishing connections between two subscribers, both of whom are located in the same local area, can be answered out of the local memories 21-25 by immediate access to the memory without long distance transmission of data.

The Fuko computers 16-20 associated with the local memories 21-25 perform the processing and decentralized storage in the local memories 21-25 of the location reports received in the radio concentrator area. Moreover, they cause the transmission of the location reports received in the radio concentrator range to the hierarchically superposed radio group computers 5-9. These location reports may be transmitted individually or in packages. Moreover, the Fuko computers cause the transfer of the location reports received in the local area, but outside the radio concentrator area, from the superposed radio group computer and, thus, maintain the local memories 21-15 up to date. Moreover, they provide for the answers of the search questions as to location involving the local area by direct access to the corresponding local memory 21 and/or 22 and/or 23 and/or 24 and/or 25. Location interrogations exceeding the local range are referred to the radio group computers 5-9. Answers to location inquiries originating from the radio group computer are received and refer to the radio concentrator.

In the immediately higher level, the radio group computers 5-9 and the global memories 10-14 associated with these computers are located. The global memories, which likewise have the task of functioning as data banks contain, individually, the location data of all of the active mobile subscribers in the entire area of the larger space. The may consist of semiconductor memories. Location search inquiries received at a Fuko computer and exceeding the local area are handled via the corresponding radio group computer from the global memories. The location data stored in the global memories are currently up-dated by the central computer 1 and/or 2 and by the Fuko computers 16-20.

The radio group computers 5-9 associated with the global memories 10-14 are provided about once in each case per radio exchange office. Computers of the Siemens 7000 Type, for example, are appropriate for this task. Their principle task consist in transferring location reports received in the local area from the Fuko computers 16-20 and to process these location reports further. This further processing includes the storage of the data in the associated global memories 10-14, the distribution and compilation into Fuko computer groups related to radio concentrators for the purpose of data transmission to the Fuko computers in group form, and compilation into a central computer group for transmission to the central computer 1 and 2, respectively. Moreover, the computers are required for transmitting the prevailing location group to the Fuko computers 16-20 and to the central computer 1 and 2, respectively. Finally, they control the transfer of the location reports received in the entire area outside the local area from the central computer and up-date the associated global memories 10-14. Moreover, the radio group computers 5-9 must answer location search inquiries exceeding the range and arriving from the Fuko computers by access to their global memory, if need be, and also compiled data groups which are radio-concentrator-related, both in the form of individual or group replies.

A transmission location computer 26, as well as a local memory 27 associated with the transmission location computer, are also provided in the level of the Fuko computer.

For the central computer 1, which forms the upper level of the hierarchy, a stand-by computer 2 is provided, so that in the case of a breakdown of the central computer 1, operation will not be disrupted. During the normal, undisrupted operation of the central computer 1, the stand-by computer 2 handles different assignments. In addition, a central memory 3 is provided and associated with the central computers 1 ad 2. Computers of the Siemens 7000 Type may likewise be used as the central computer 1 and the stand-by computer 2. A magnetic A.S. 8.2.78 disk memory is used, preferably, as the central memory 3.

The principal task of the central computer 1 consists in transferring the location reports received in the entire metropolitan area which are transmitted as central computer groups by the radio group computers 5-9, to further process the location reports and to compile the reports in the form of radio-group-related data groups to the radio group computers and to transmit the same to the radio group computers.

The central computer 2 handles, in addition to the stand-by operation for the central computer 1, the task of feeding new mobile subscribers into the central memory 3, to transfer the call data codes (statistics, fees) received in the computers of the exchange system, to process the call data codes, in order to thereby produce the billing for mobile subscribers and to compile statistics.

All master data needed for the administration of the subscribers' records are stored in the central memory 3. The data bank operations of the central memory and the access are accomplished by the central computer 1 and 2, respectively, within the scope of administrative and statistical programs.

Figure 2:
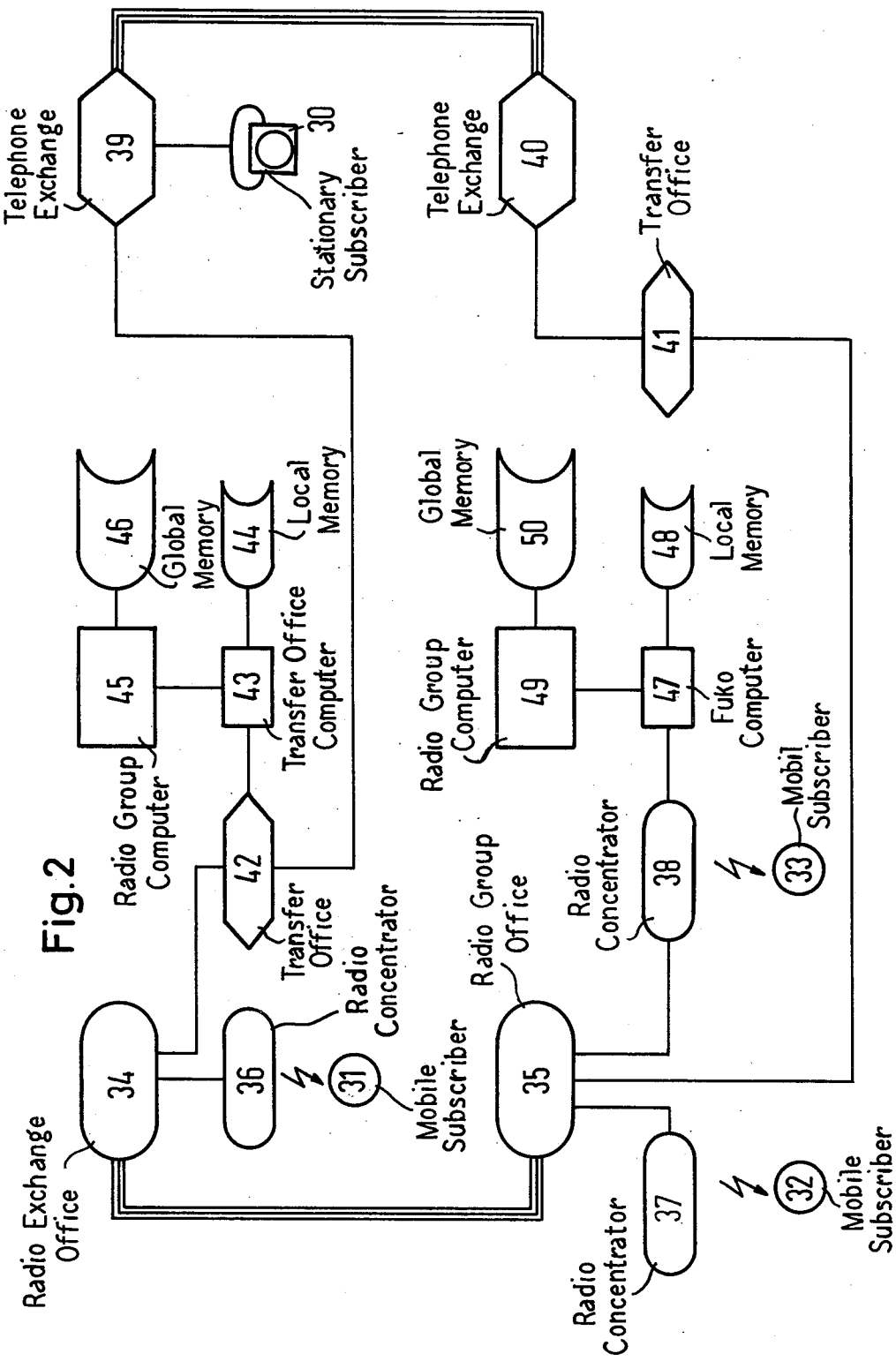
FIG. 2 is a schematic representation for explaining the search for location and establishing connections.

FIG. 2 serves to explain the structure of the communications in the telephone and data network according to the present invention. A first example here relates to the case where a stationary subscriber calls a mobile subscriber, for example in FIG. 2 the subscriber 30 calls a mobile subscriber 31. To accomplish this, the stationary subscriber 30 first dials a special number which connects him by way of his telephone exchange 39 to the corresponding transfer office 42, and then he dials the mobile subscriber's telephone number. The establishing of the mobile subscriber's location is now handled by the transfer office computer 43 associated with the transfer office 42, first with the aid of its own local memory 44, and if the mobile subscriber is not within the area of the associated radio exchange office 34, by access via the radio group computer 45 into the global memory 46. After determining the mobile subscriber's location, the transfer office 42 directs a call via the radio exchange office 34 to the radio concentrator 36 which constructs the radio connection to the mobile subscriber 31 after transmitting the call number.

Another possibility exists where a mobile subscriber, for example the mobile subscriber 32, calls a stationary subscriber, for example the subscriber 30. For this purpose, the mobile subscriber 32 dials the area code and the telephone number of the subscriber to the local telephone system. The radio concentrator 37 associated with the mobile subscriber 32 therefrom determines the call number of the corresponding transfer office; this may be either the transfer office 41 located most proximal to the Fuko or the transfer office 42 located most proximal to the stationary subscriber. The radio concentrator 37 thus directs its call to this determined transmitting office, for example the transfer office 41, the call being transmitted from his radio exchange office 35 and possibly the subsequent radio transfer office. The transfer office 41 evaluates the telephone number of the stationary subscriber 30 and establishes a connection in the telephone network to that subscriber by way of the exchanges 40 and 39.

Another possibility is that a first mobile subscriber, for example the mobile subscriber 33 calls a second mobile subscriber, for example the mobile subscriber 32. The subscriber 32 is within the area of the radio concentrator 37, while the subscriber 33 is in the area of the radio concentrator 38. However, both subscribers are assigned to the area of the same radio exchange office 35. The radio concentrator 38 thus can determine with the aid of the Fuko computer 47 from the local memory 48 that the called subscriber 32 is in the area of the radio concentrator 37 and it directs its call via the radio exchange office 35 to the radio concentrator 37. Then, the radio concentrator 37 established the desired radio connection with the mobile subscriber 32.

If, on the other hand, for example, the mobile subscriber 33 calls the mobile subscriber 31 who is located in the area of a different radio exchange office 34, the local inquiry of the radio concentrator 38 to the local memory 48 shows that the mobile subscriber 31 is not listed in that area. Then, a location inquiry is directed, via the Fuko computer 47, to the radio group computer 49, which determines from its global memory 50 the location data and delievers the same via the Fuko computer 47 to the radio concentrator 38. The radio concentrator 38 then can send a call directly via a connection between the radio exchange offices 35 and 34 to the radio concentrator 36, whereupon the radio concentrator 36 establishes a radio communication to the mobile subscriber 31. In the alternative, a connection is also possible via the transfer office 41, the telephone exchange 40 and 39, the transfer office 42 and the radio exchange office 34.

The fees incurred by the mobile subscribers are processed by the exchange computer of the radio exchange office in subscriber-related call data codes which are then transmitted during non-peak hours to the central computer 1 and 2 respectively, where they are evaluated.

Figure 3:
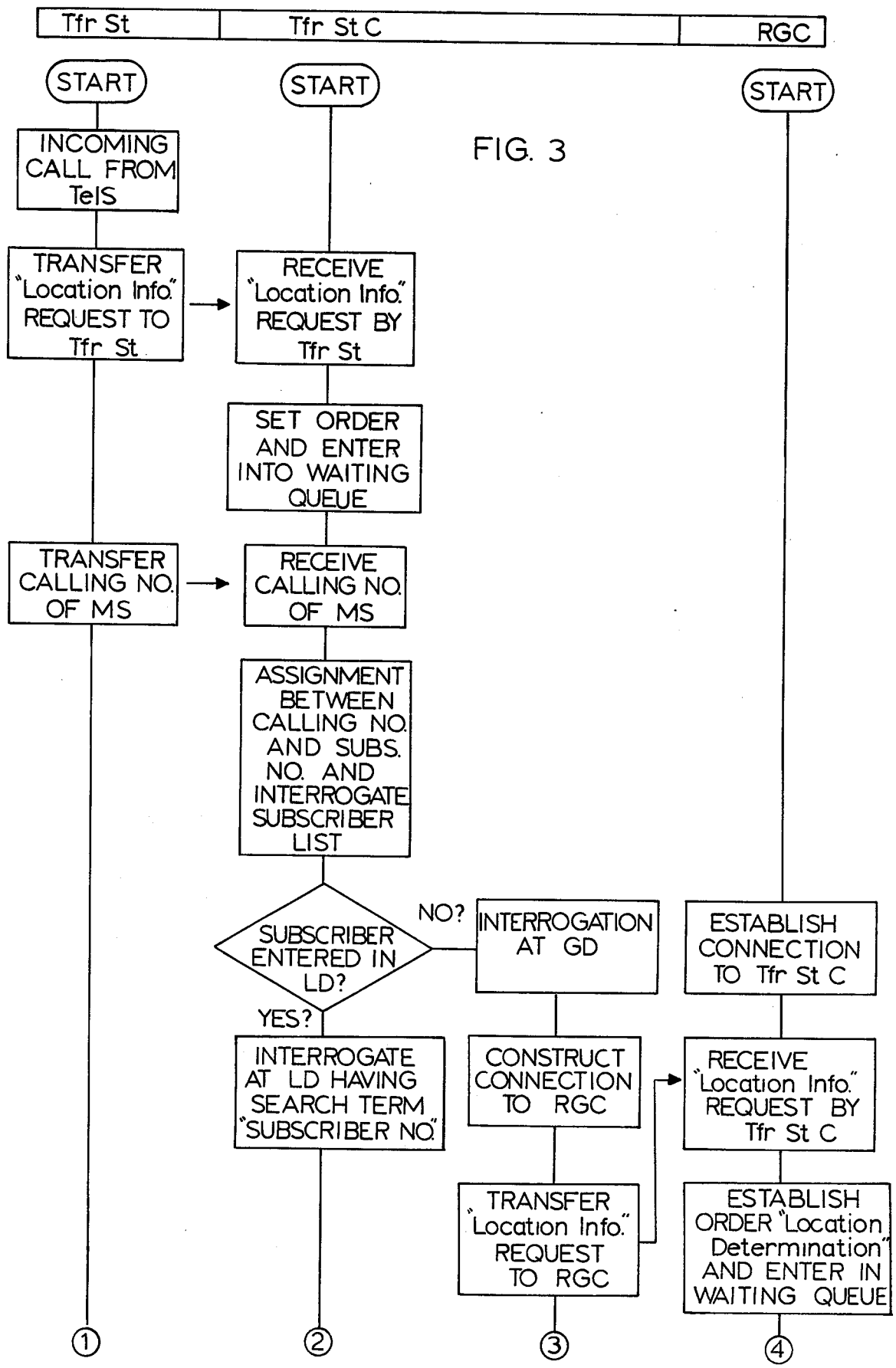

FIGS. 3 and 4 are flow charts which aid in understanding the invention. These flow charts are set forth with acronyms and the like for reference to FIGS. 1 and 2 in accordance with the following table.

Tel S—Telephone Subscriber
MS—Mobile Subscriber
Tfr St—Transfer station
Tfr St C—Transfer Station Computer
RGC—Radio Group Computer
LD—Local Data Store
GD—Global Data Store
R Conc—Radio Concentrator
R Comm St—Radio Communication Station Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a telephone and data network for mobile subscribers of the type wherein radio concentrators are locally distributed in the overall area of a radio network and can communicate by radio with mobile subscribers, and radio exchange offices are associated with one or more radio concentrators and are connected to the public communication system which may include telephone, teleprinter and data transmission networks, the improvement therein comprising:

a local memory operative to store, for interrogation, the call number and area code of the location of each mobile subscriber in a smaller area within the overall larger area; and a global memory operatively associated with a plurality of said memories and storing, for interrogation, the date on the prevailing location of each mobile subscriber in the larger overall area.

2. The improved telephone and data network of claim 1, further defined as comprising:

a central computer connected to control the exchange of data relating to subscribers' locations between said local and global memories.

3. The improved telephone and data network of claim 2, further defined as comprising:

a global computer operatively associated with said global memory;

a plurality of local computers operatively associated with respective ones of said local memories; and said local and global computers connected to said central computer forming a hierarchial computer system.

4. The improved telephone and data network of claim 3, wherein:

said global computers are operatively connected to said radio exchange offices and said local computers are operatively connected to said radio concentrators.

5. The improved telephone and data network of claim 1, further defined wherein:

each of said local memories is connected to a respective radio exchange office and stores, for interrogation, data of all subscribers who are present in the corresponding radio exchange office area.

* * * * *